United States Patent Office 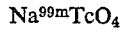

3,725,295
Patented Apr. 3, 1973

---

3,725,295
TECHNETIUM LABELING
William C. Eckelman, Hauppauge, and Powell Richards, Bayport, N.Y., assignors to the United States of America as represented by the United States Atomic Energy Commission
No Drawing. Filed July 20, 1971, Ser. No. 164,431
Int. Cl. A61k 27/04
U.S. Cl. 252—301.1 R                            3 Claims

ABSTRACT OF THE DISCLOSURE

The process of using $^{99m}Tc$ in a radiopharmaceutical comprising the use of a stannous ion as the reducing agent with the pertechnetate ion containing the radionuclide.

SOURCE OF THE INVENTION

The invention described herein was made in the course of, or under a contract with, the United States Atomic Energy Commission.

BACKGROUND OF THE INVENTION

The use of $^{99m}Tc$ as a tracer in nuclear medicine has rapidly increased during recent years. A rare combination of nuclear properties gives this radionuclide considerable advantages over other agents in certain applications such as organ visualization and tumor localization. The development of a simple generator from which this 6 hr. half-life isotope can be eluted from its parent, 2.7 day $^{99}Mo$, has made it possible to use the isotope at great distances from the production site.

Advantages of technetium-99m include its 6-hr. half-life which although short is sufficiently long for many applications and its gamma radiation energy (140 kev.) which has satisfactory tissue penetration and yet is readily collimated. Absence of beta radiation makes feasible the administration of millicuri amounts of the nuclide with tolerable radiation dosage to the patient. Further, the radioactivity of the $^{99}Tc$ ground state is of no consequence because of its very long half-life.

Chemically, technetium belongs to group VII–A and behaves like manganese and rhenium, the resemblance to the latter being particularly close in the higher oxidation states. As the pertechnetate ion ($TcO_4^-$), the most stable form in aqueous solution, technetium resembles iodide very closely in its biological distribution, thereby making it feasible to use this isotope for short-term thyroid studies and scanning. $^{99m}Tc$ as the pertechnetate ion is particularly useful for brain scanning, due to the large amounts of activity which can be injected compared to other nuclides which can be used.

The ability of technetium to combine with other materials when reduced to lower oxidation states makes it useful when chelated with an appropriate carrier for kidney function studies or, when trapped physically as a colloid, useful to study lung, liver, or spleen function. A $^{99m}Tc$-labeled colloid prepared by coprecipitation with elemental sulfur is useful for visualization of the recticuloendothelial system and for studies of bone-marrow distribution.

It is thus seen that $^{99m}Tc$ has many posible uses as a medical tracer provided this radionuclide can be incorporated conveniently, economically, and with reliability into the appropriate carrier. However, long and complicated procedures available up to now to label a carrier with $^{99m}Tc$ represent very important practical limitations on the use of this isotope.

For example, as pure diethylenetriaminepenta-acetic acid (hereinafter referred to as DTPA) passes completely through the kidney, when $^{99m}Tc$ is chelated with this compound the kidney function may be visualized. One way in which this tracer material can be prepared is first mixing ferric chloride in acid solution with solid sodium ascorbate, raising the pH, adding DTPA, and then $$Na^{99m}TcO_4$$

Controlling the pH is very critical and even under the most closely controlled circumstances, not all of the radionuclide becomes chelated with the DTPA, some remaining with the ascorbate. The result is that not all of the $^{99m}Tc$ passes through the kidney with the DTPA, some remaining in the kidney, and some staying in the blood stream. In many of the current applications of $^{99m}Tc$ as a tracer this difficulty of a critical pH which must be maintained during the preparation of the tracer material presents itself.

Another problem currently associated with the use of this radionuclide has to do with the fact that the material to carry the tracer must be prepared at the time it is to be used thereby requiring each medical facility to have facilities and personnel to prepare the tracer material. As a result of these and other difficulties, full utilization of $^{99m}Tc$ as a tracer element has not up to now been made.

SUMMARY OF THE INVENTION

The present invention overcomes many of the problems mentioned above in connection with the preparation and use of tracer materials employing $^{99m}Tc$ as the radionuclide by providing an approach which eliminates the critical pH requirements of previous methods, is reliable, and facilitates in some embodiments the preparation of the complete solution except for the presence of the radionuclide in advance, so that at the time of use only the Tc need be added.

It has been discovered that when the stannous ion is employed as the reducing agent for the Tc, reduction is not critically dependent on a particular pH, that it can be carried out at a neutral value. Also, the tin does not require the presence of the ascorbate as $Fe^{+3}$ does, avoiding the possibility that some of the radionuclide will be bound to the ascorbate.

In accordance with a preferred embodiment of this invention, the stannous ion is employed as the reducing agent with the chelate DTPA for preparing a solution ready for the addition of $NaTcO_4$ when the pharmaceutical is to be used, for brain scanning or for visualizing kidney function. The stannous ion is also used in other embodiments such as with acid citrate dextrose (ACD) as a solution for use in the labeling of red blood cells.

It is thus a principal object of this invention to provide an improved approach to the utilization of $^{99m}Tc$ as a radionuclide in medical tracer applications.

Other objects of this invention will hereinafter become evident from the following description of preferred embodiments of this invention.

DESCRIPTION OF THE PREFERRED EMBODIMENTS

In order to utilize $^{99m}Tc$ as a radionuclide for certain medical tracer applications, it is necessary to have the isotope present in a reduced state, that is, at less than the seven valence state. In the reduced state, the Tc is chelated with an agent such as DTPA for kidney function studies or it is trapped physically, as a colloid, for use in lung, liver, spleen, or bone marrow studies, depending on aggregate size.

In accordance with the principles of this invention, the stannous ion is employed as the reducing agent, and in some embodiments a nonradioactive ("cold") solution may be prepared in advance and stored indefinitely, until such time as the $^{99m}$Tc is added, in the form of the pertechnetate ion from NaTcO$_4$ in normal saline solution.

In one embodiment of this invention, for study of kidney function and brain scanning, the radiopharmaceutical employing $^{99m}$Tc as the tracer element is prepared by adding tin first to a water solution of DTPA. Since all the tin must be chelated, leaving none as a hydroxide, the tin, which may be powdered or solid, is added not in excess of a one to eight mole ratio to DTPA (in other words, a relatively large excess of DTPA) and the mixture is heated until the tin is dissolved. The solution is tested or verified by chromatography. This solution is then stored until ready to be used. At that time the pertechnetate ion, a solution of NaTcO$_4$ with $^{99m}$Tc as the radionuclide is added to form the so-called instant $^{99m}$Tc DTPA solution. The solution is then useful for brain scanning or studying kidney function. Sufficient NaTcO$_4$ is added to provide the activity required to view the particular function.

The following illustrates the use of $^{99m}$Tc with DTPA:

Example 1

The preparation of a stock solution of DTPA with chelated tin for about 40 patients was as follows:

To 1 ml. of 100 mg./ml. CaNa$_3$-DTPA solution was added 5 mg. SnCl$_2$·2H$_2$O and heated at 100° C. under N$_2$ for 15 min. This was diluted to 18 ml. with sterile H$_2$O and the pH was adjusted to 4.0 with HCl. The result was diluted to 20 ml. with sterile H$_2$O and the solution was then filtered through a sterile 0.22-micron filter into vials under N$_2$, 1 ml. of solution per vial.

To prepare a $^{99m}$Tc-DTPA solution for use as a tracer, 3 ml. of pertechnetate (Na$^{99m}$TcO$_4$) saline solution was added to 1 ml. of the stock DTPA solution and mixed for 1 min.

Stability of the stock solution and the instant $^{99m}$Tc-DTPA was determined. The stock solution was stable for at least 7 days as indicated by preparation of $^{99m}$Tc-DTPA with less than 5% impurity. The instant $^{99m}$Tc-DTPA was stable for at least 4 hrs. as indicated by less than 5% impurity. Stability studies were conducted using gel chromatography and paper chromatography.

In another embodiment of this invention, for the labeling of red blood cells, a sample of blood is drawn in ACD and centrifuged to separate the red blood cells from the plasma. A saline solution of Na$^{99m}$TcO$_4$ is added to the red blood cells at a neutral pH to allow anionic technetium to cross the cell membranes and enter the cells. In order to reduce the TcO$_4^-$ ions and chelate the Tc thereby fixing it in the cells, a solution of Sn in ACD is then added to the blood cells. This solution is prepared with an overabundance of ACD to insure complete chelating of the tin, and is filtered before use to remove all colloidal tin.

It should be noted in connection with the blood cell labeling procedure just described that the previously used techniques involving the use of iron as the reducing agent is dangerous because to lower the pH of blood presents the problem of possible coagulation of the blood. The present method using tin as the reducing agent is thus far safer than the previously used method. The ACD solution used in the following example was trisodium citrate (3 gm.), sodium dihydrogen phosphate (0.015 gm.), dextrose (0.2 gm.), H$_2$O (up to 100 ml.).

An example of the procedure used to label blood cells is as follows:

Example 2

A 16 ml. sample of blood was drawn from the patient into a syringe containing 4 ml. of ACD solution. The blood was then transferred to a centrifuge tube and centrifuged for 10 min. at 1,500 r.p.m., after which 4 ml. of red blood cells were drawn from the lower layer. Then 0.1 ml. Na$^{99}$TcO$_4$ solution in saline was added to the removed red blood cells and the mixture was incubated for 30 min. at 37° C. Then 0.1 ml. of 1 mg./ml.

SnCl$_2$·2H$_2$O in ACD solution for bloodpool localization was added. The solution was then shook at room temperature for 15 min., washed twice with 25 ml. isotonic saline, and the cells resuspended in saline to prevent agglutination.

To determine the stability of the labeled red blood cells, blood was drawn from a rabbit, labeled, and reinjected. Blood samples were then taken at 0, 2, and 4 hrs.; over 98% of the activity was on the red blood-cell fraction and less than 2% in the plasma fraction in all samples. When pertechnetate was injected in the same rabbit, 75% of the activity was in the plasma fraction. A similar experiment with blood samples from a dog taken at times up to 26 hr. also showed that over 95% of the activity remaining in the blood was in the red blood-cell fraction. Chromatography indicated that this activity is associated with the hemoglobin. To test the in vitro stability, labeled red cells were mixed with plasma for 1 hr. and 1½ hrs. The blood was then separated and the red cells washed. In both cases, the plasma contained less than 3% of the activity, and a single saline wash contained less than 1.5% of the activity.

A third embodiment of this invention is the procedure developed from producing $^{99m}$Tc HSA, where HSA is human serum albumin, useful in cisternography, placental localization, vascularity studies, etc. The approach is similar to that used in preparing $^{99m}$Tc DTPA.

Stannous HSA chelate can be prepared at various pH values. However, unlike the DTPA case, the majority of the tin could not always be chelated, the rest being present as colloid. This presented problems because the colloid could compete with the HSA for the $^{99m}$Tc. It was found that the elimination of this competitive binder effect could be achieved with varying success by (1) using less initial stannous ion, (2) removal of the tin colloid before addition of pertechnetate, or (3) adding the technetium at a pH sufficiently low to prevent tin particle formation.

The first approach, minimizing the effect of stannous hyroxide by reducing the total stannous ion concentration led to high yields (i.e., about 90% with ±10% variability) of $^{99m}$Tc HSA. The second approach involved removing the stannous hydroxide by eluting the stock solution through a gel chromatographic column at pH 6 before addition of the pertechnetate which also gave yields in the 90% range.

Both of these procedures which incorporate stock solutions at pH 6 gave relatively high yields but both were more variable and not as high as the final procedure developed, the low pH method. In this procedure, the technetium is added to a solution of SnCl$_2$·2H$_2$O and HSA at pH 2. HCl solution is present to reduce the pH value. The important factor here does not seem to be the volume of the pertechnetate per se but rather the resulting pH of the solution which must be between 2 and 3, to obtain complete chelation of the pertechnetate. After chelation of the pertechnetate sufficient Na$_2$HPO$_4$ is added to bring the pH of the solution up to 6-7 to be useful in the human body. This procedure gives $^{99m}$Tc HSA of high yield and high reproducibility. It is not a one-step procedure as the tin HSA cannot be stored at pH 1 because of gel formation and because the pH must be raised after pertechnetate addition. However, the low pH method produces increased yields and greater reliability as compared to the two one-step instant procedures.

The following is an example of the low pH method of producing $^{99m}$Tc HSA:

Example 3

A stock solution of SnCl$_2$·2H$_2$O in 1 N HCl was prepared by dissolving 12.5 mg. SnCl$_2$·2H$_2$O in 1 ml. of conc. HCl, followed by heating and diluting to 25 ml.

with $N_2$ purged water (to remove $O_2$). This solution was then stored under $N_2$ in 10 cc. capped vials, 0.5 ml. per vial.

To 250 μg. $SnCl_2 \cdot 2H_2O$ in 0.5 ml. 1 N HCl was added 1 ml. of 250 mg./ml. HSA followed by 0.1–2 ml. of $Na^{99m}TcO_4$. The foregoing were mixed for about a minute and then 0.6 ml. of 0.8 M $Na_2HPO_4$ was added. The latter increases the pH to between 6 and 7. In eight separate experiments using this procedure an average of 96% as $^{99m}Tc$ HSA was obtained. In all experiments, the pH of the solution obtained after adding the pertechnetate was between 2 and 3.

The use of the stannous ion as a reducing agent in the preparation of $^{99m}Tc$ for the use as a radiopharmaceutical in accordance with the principles of this invention makes it possible to overcome many of the difficulties and problems associated heretofore with the application of this radionuclide. The method is simple, reliable, economical, and relatively free of the possible complications in its use noted in connection with other methods.

What is claimed is:

1. In the process of labeling diethylenetriamine pentaacetic acid with $^{99m}Tc$ wherein the pertechnetate ion containing $^{99m}Tc$ is contacted with the stannous ion, the steps of chelating the tin with diethylenetriamine pentaacetic acid in a ratio of the tin not in excess of one to eight mole ratio to diethylenetriamine pentaacetic acid and thereafter adding a saline solution of $Na^{99m}TcO_4$ to form $^{99m}Tc$ diethylenetriamine pentaacetic acid solution.

2. In the process of labeling red blood cells with $^{99m}Tc$ wherein the pertechnetate ion containing $^{99m}Tc$ is contacted with the stannous ion, the steps of adding a saline solution of $Na^{99m}TcO_4$ to red blood cells at a neutral pH, incubating the resulting mixture and thereafter adding a solution of tin acid citrate dextrose to reduce the pertechnetate ion and chelate the $^{99m}Tc$, thereby labeling said red blood cells with $^{99m}Tc$.

3. In the process of labeling human serum albumin with $^{99m}Tc$ wherein the pertechnetate ion containing $^{99m}Tc$ is contacted with the stannous ion, the steps of adding human serum albumin to a solution of $SnCl_2 \cdot 2H_2O$ in sufficient 1 N HCl to reduce the pH value to 2–3, adding and mixing a solution of $Na^{99m}TcO_4$, and thereafter adding sufficient $Na_2HPO_4$ to increase the pH to 6–7.

References Cited
UNITED STATES PATENTS 3,466,361  9/1969  Richards et al. _____ 424—1

OTHER REFERENCES

Morcellet, "Use of Tin-$^{99m}$ Technetium . . ." Nuc. Sci. Abs., vol. 24, No. 4, Abs. No. 6078, p. 617, February 1970.

Taplin, "Recent Advances in Kidney Scanning" Nuc. Sci. Abs., vol. 22, No. 21, Abs. No. 45633, p. 4635, November 1968.

Deckart, "Advantages and Disadvantages of Isotope Placentography with $^{99m}Tc$ . . ." Nuc. Sci. Abs., vol. 21, No. 24, 1967, #45737.

Charamza, "Preparation of a $^{99}Tc^m$-Sn Complex for Renal Scintigraphy," Chem. Abst., vol. 72, #87066j, 1970.

CARL D. QUARFORTH, Primary Examiner

R. L. TATE, Assistant Examiner

U.S. Cl. X.R.

424—1